Figure 1:
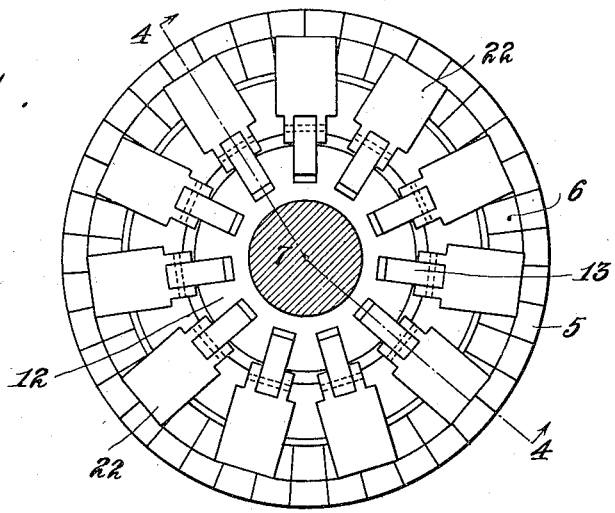

C. L. KENNEDY.
SHORT CIRCUITING DEVICE FOR ELECTRIC MOTORS.
APPLICATION FILED AUG. 1, 1914.

1,145,594.

Patented July 6, 1915.

Witnesses:
Miriam C. Query.
Alice Ackroyd.

Inventor:
Carlton L. Kennedy
by his attorneys
Phillips, Van Everen & Fish

UNITED STATES PATENT OFFICE.

CARLTON L. KENNEDY, OF SOUTH BRAINTREE, MASSACHUSETTS, ASSIGNOR TO THE HOLTZER-CABOT ELECTRIC COMPANY, OF BROOKLINE, MASSACHUSETTS, A CORPORATION OF MASSACHUSETTS.

SHORT-CIRCUITING DEVICE FOR ELECTRIC MOTORS.

1,145,594.     Specification of Letters Patent.     Patented July 6, 1915.

Application filed August 1, 1914. Serial No. 854,522.

*To all whom it may concern:*

Be it known that I, CARLTON L. KENNEDY, a citizen of the United States, residing at South Braintree, in the county of Norfolk and State of Massachusetts, have invented certain new and useful Improvements in Short-Circuiting Devices for Electric Motors; and I do hereby declare the following to be a full, clear, and exact description of the invention, such as will enable others skilled in the art to which it appertains to make and use the same.

This invention relates to improvements in short-circuiting devices for electric motors and more particularly to induction motors. In order that this type of motor may be self-starting it is commonly provided, in addition to a primary or stator winding directly connected with the source of current, with a commutator connected by windings with the rotor, similar to a direct current motor. The commutator as thus connected is used to start the motor and bring it up to the required speed at which point the commutator with the rotor winding is short-circuited, and the motor thereafter operates as an induction motor.

The devices most commonly employed for effectuating the short-circuiting operate automatically by means of centrifugal force. Of the various types of short-circuiting devices, some contact the commutator on its under side, others contact it on one end. The most serious defect in these various kinds of short-circuiting devices has lain in the fact that they are directly subjected to the pressure of the spring which tends to keep them normally out of contact with the commutator. When the commutator-contacting members of the short-circuiting device are acted upon by centrifugal force and in consequence thereof move into contact with the commutator, the pressure which holds the contacting members against the commutator is exerted directly by two means, namely, the spring and the centrifugal force. The travel of the contacting members upon the commutator under these conditions tends to score channels in the soft metal of the commutator. This scoring is detrimental to the efficient and continued service of the motor.

One object of the present invention is to produce a short-circuiting device of such construction that the centrifugally-operated members will not score the commutator. This is effected by constructing the device of two parts hinged together, the one part acted upon by the spring and the other part being directly subjected to centrifugal action only.

Other objects of the invention will hereinafter appear.

Figure 2:
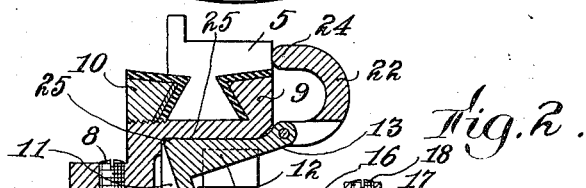
Figure 3:
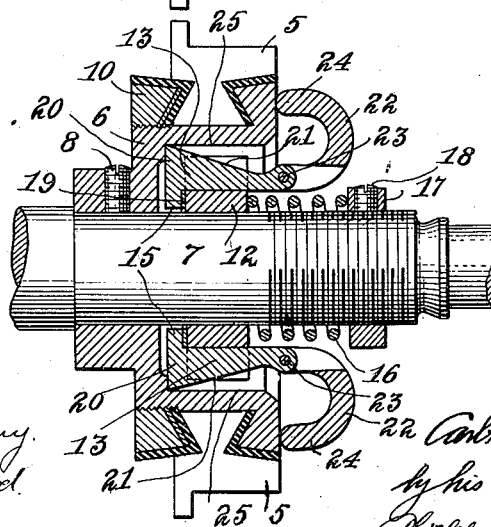

In the accompanying drawings illustrating the preferred form of the invention: Figure 1 is an end elevation of a commutator with the improved short-circuiting devices applied thereto; Fig. 2 is a sectional view on line 4—4 of Fig. 1, showing the contact blocks in contact with the commutator; and Fig. 3 is a similar view showing the contact blocks out of contact with the commutator.

The commutator segments 5 are mounted upon a commutator spool 6 which is rigidly secured to the rotor shaft 7 by means of the set screw 8. The outer end of the spool has an upwardly projecting flange or lip 9 having a beveled inner face. The inner end of the periphery of the spool is threaded to receive thereon an annular nut 10 having a beveled face corresponding to the inner face of the lip 9. The commutator segments are firmly positioned between the lip and the nut, being insulated from them in the usual manner. Between the commutator spool and the rotor shaft is formed a rocker-arm chamber 11 and within this chamber is situated an annular sleeve 12 loosely slidable upon the rotor shaft 7 and provided with radial slots which are adapted to receive and loosely hold the rocker-arms 13. The rocker-arms are somewhat triangular in shape and are each furnished with a heel 15 depending from the base end. This heel receives the thrust of the spring 16 interposed between the outer end of the annular sleeve 12 and the adjustable ring 17 by which the tension of the spring may be regulated, the ring being secured to the shaft by the set screw 18. In order that the rocking action of the heel 15 may not wear away the inner end of the sleeve 12 a hardened steel washer 19 is provided. The pressure of the spring tends constantly to force the base 20 of the rocker-arms against the end wall of the chamber, thereby keeping the bottom side 21 of the arms contiguous to the bottoms of the slots in the annular sleeve 12, as shown in Fig. 2.

On the outer end of each rocker-arm is pivoted a substantially U-shaped contact block 22. It will be observed, and herein lies one of the features of my invention, that the center of gravity of the contact block lies beyond the pivots 23, that is to say, beyond the plane of the pivots. The free or contacting end 24 of the contact block projects inwardly toward the commutator from the center of gravity of the blocks, in consequence thereof, when the blocks are caused to fly outwardly under centrifugal force, they must come in contact, first with the outer end of the commutator spool, then with the outer end of the commutator itself. The stronger the action of the centrifugal force the greater will be the pressure of the block against the commutator. It will be further and more particularly observed that no part of the pressure of the spring 16 is exerted upon the contact blocks. The pressure of the spring is entirely taken up by the rocker-arms.

It is well known that a repulsion motor will operate as an induction motor with the commutator short circuited at a number of points, the efficiency and maximum load increasing first very rapidly as the number of short circuiting points is increased above two, but increasing very slowly after five or six points on the commutator have been connected. Furthermore, a device of this sort is usually used with a so-called wave or two-circuit winding on the armature, and as these motors are usually wound to have 4, 6 or 8 poles, it is evident that in order to obtain as many electrically effective contact points on the commutator as there are contact blocks, it is desirable to employ a number of contact blocks which will not be divisible by the number of pairs of poles on the motor. In the illustrated embodiment of the invention, eleven contact blocks are used, as this has been found to give good results.

In use my improved short-circuiting device operates as follows: Immediately upon starting up the motor the contact blocks 22 under the action of centrifugal force are thrown against the outer end of the commutator spool, as shown in Fig. 3. As the speed of the motor increases, the ends of the contact blocks travel across the face of the spool until they reach the commutator, as shown in Fig. 2, when the motor attains the predetermined critical speed. The outward throw of the blocks is limited by the rocker-arms which, being pulled outward radially, are brought up against the side wall 25 of the rocker-arm chamber. By properly adjusting the strength and tension of the spring 16 to the weight of the contact blocks, the centrifugal force due to the outward travel of the blocks may be made to increase faster than the increase in the tension of the spring, with the result that the contact block will attain a short-circuiting contact with the commutator by a quick movement.

I have described the preferred form of my invention; it is obvious, however, that it may be embodied in other forms. It is my purpose to claim these constructions broadly within the spirit of the following claims.

1. A short circuiting device for electric motors, having, in combination, a commutator, and a plurality of rocker-arms provided with means pivoted at their outer ends adapted when subjected to centrifugal force to be brought into contact with the commutator.

2. A short circuiting device for electric motors, having, in combination, a commutator, of a plurality of rocker-arms, and a plurality of contact blocks pivoted at the outer ends of the rocker-arms and adapted under the influence of centrifugal force to contact the commutator.

3. A short circuiting device for electric motors, having, in combination, a commutator, an annular sleeve provided with radial slots, a plurality of rocker-arms movable in said slots, and a plurality of U-shaped contact blocks pivoted at the outer ends of the rocker-arms, and adapted to contact the commutator at a predetermined motor speed, the center of gravity of the contact blocks lying beyond the pivots.

4. A short circuiting device for electric motors, having, in combination, a commutator, a plurality of rocker-arms, an annular sleeve supporting the rocker-arms, and contact blocks pivoted respectively on the rocker-arms, the center of gravity of the contact blocks being beyond the pivots and the free ends of the contact blocks being interposed between their centers of gravity and the commutator, so that when the contact blocks are acted upon by centrifugal force their free ends are brought into contact with the commutator.

5. A short circuiting device for electric motors, having, in combination, a shaft, a commutator mounted on it and forming a chamber with end and side walls around the shaft, an annular sleeve slidingly mounted upon the shaft and provided with radial slots, a plurality of rocker-arms movable in said slots and located within the chamber, a spring tending to press the base ends of the rocker-arms against the end wall of the chamber, and a plurality of contact blocks pivoted at the outer ends of the rocker-arms respectively and adapted under the influence of centrifugal force at a predetermined speed to overcome the action of the spring upon the rocker-arms and force them against the side wall of the chamber.

6. A short-circuiting device for electric motors, having, in combination, a commutator, an armature shaft, an annular sleeve slidable on the armature shaft and provided with radial slots, rocker-arms movable in the slots, a collar engaging a projection from said arms, a spring acting upon the collar and normally holding the bottom side of the rocker-arms against the bottom of the slots of said sleeve, and contact blocks pivotally connected to one end of said rocker-arms respectively and adapted at a predetermined speed to fly outwardly, thereby overcoming the tension of the spring and causing the rocker-arms to move radially outward in said slots.

7. A short circuiting device for electric motors, having in combination, a commutator, and a short circuiting device therefor consisting of spring resisted rocker-arms each provided with a pivoted centrifugal contact block.

8. A short circuiting device for electric motors, having, in combination, a commutator, rocker-arms and contact blocks pivoted on the rocker arms constructed and arranged so that they may be brought into contact with the commutator by centrifugal force, the pivots being adapted to move in the line of the centrifugal force.

9. A short circuiting device for electric motors, having, in combination, a commutator, two articulated short circuiting members and resilient means for normally holding the short circuiting members in inoperative position, said members being constructed and arranged to be brought into operative position by centrifugal force, one of said members being adapted to compress the resilient means to permit the other member to contact the commutator with a pressure equal to the effect of the centrifugal force on said member.

10. A short circuiting device for electric motors, having, in combination, a short-circuiting contact device, a commutator having a surface over which the contact device is movable outwardly to operative position, a spring for returning the contact device to inoperative position, and connections between the contact device and the spring subject to centrifugal force whereby the contact device may be moved outwardly as aforesaid, said connections being constructed and arranged to resolve the centrifugal force to a comparatively great component effective against the spring and a comparatively small component effective to press the contact device against said surface.

CARLTON L. KENNEDY.

Witnesses:
   Geo. E. Stebbins,
   Alice Ackroyd.